US012011849B2

(12) United States Patent
Eichberger et al.

(10) Patent No.: US 12,011,849 B2
(45) Date of Patent: Jun. 18, 2024

(54) METHOD OF PRODUCING A PLURALITY OF CONCRETE CAST ELEMENTS

(71) Applicants: VOESTALPINE RAILWAY SYSTEMS GMBH, Leoben (AT); VOESTALPINE TURNOUT TECHNOLOGY ZELTWEG GMBH, Zeltweg (AT)

(72) Inventors: Peter Eichberger, Knittelfeld (AT); Wolfgang Hölzl, Spielberg/Knittelfeld (AT); Anton Schaffer, Zeltweg (AT); Rolf Rühling, Raunheim (DE); Winfried Mohr, Neumarkt (DE)

(73) Assignees: VOESTALPINE RAILWAY SYSTEMS GMBH, Leoben (AT); VOESTALPINE TURNOUT TECHNOLOGY ZELTWEG GMBH, Zeltweg (AT)

( * ) Notice: Subject to any disclaimer, the term of this patent is extended or adjusted under 35 U.S.C. 154(b) by 364 days.

(21) Appl. No.: 17/605,462

(22) PCT Filed: Apr. 22, 2020

(86) PCT No.: PCT/IB2020/053793
§ 371 (c)(1),
(2) Date: Oct. 21, 2021

(87) PCT Pub. No.: WO2020/217181
PCT Pub. Date: Oct. 29, 2020

(65) Prior Publication Data
US 2022/0212365 A1 Jul. 7, 2022

(30) Foreign Application Priority Data
Apr. 23, 2019 (EP) .................................... 19450007

(51) Int. Cl.
*B28B 23/02* (2006.01)
*B28B 23/04* (2006.01)
*B28B 23/06* (2006.01)

(52) U.S. Cl.
CPC .......... *B28B 23/043* (2013.01); *B28B 23/026* (2013.01); *B28B 23/06* (2013.01)

(58) Field of Classification Search
CPC ...... B28B 23/043; B28B 23/026; B28B 23/06
See application file for complete search history.

(56) References Cited

U.S. PATENT DOCUMENTS

| | | | |
|---|---|---|---|
| 4,272,875 | A | 6/1981 | Silvander |
| 4,421,710 | A | 12/1983 | Borcoman |

FOREIGN PATENT DOCUMENTS

| | | | | | |
|---|---|---|---|---|---|
| CH | 386667 | A | | 1/1965 | |
| CN | 1796073 | A | * | 7/2006 | ........... B28B 23/026 |
| FR | 1007718 | A | | 5/1952 | |

OTHER PUBLICATIONS

Mechanical translation of CN 1796073 A dated Jul. 2006. (Year: 2006).*

(Continued)

*Primary Examiner* — Robert B Davis
(74) *Attorney, Agent, or Firm* — Pillsbury Winthrop Shaw Pittman, LLP

(57) ABSTRACT

In a method for producing a plurality of concrete cast elements of prestressed concrete, in particular for producing of railway sleepers, in a long bed which is a multiple of the length of a concrete cast element, in which separating elements are installed in the long bed to define the length of each of the concrete cast elements to be casted, a first and a second separating element for defining the length of a concrete cast element together with a tensioning device with tensioning elements for tensioning the concrete cast element between the two separating elements are mounted in the (Continued)

Figure 1:
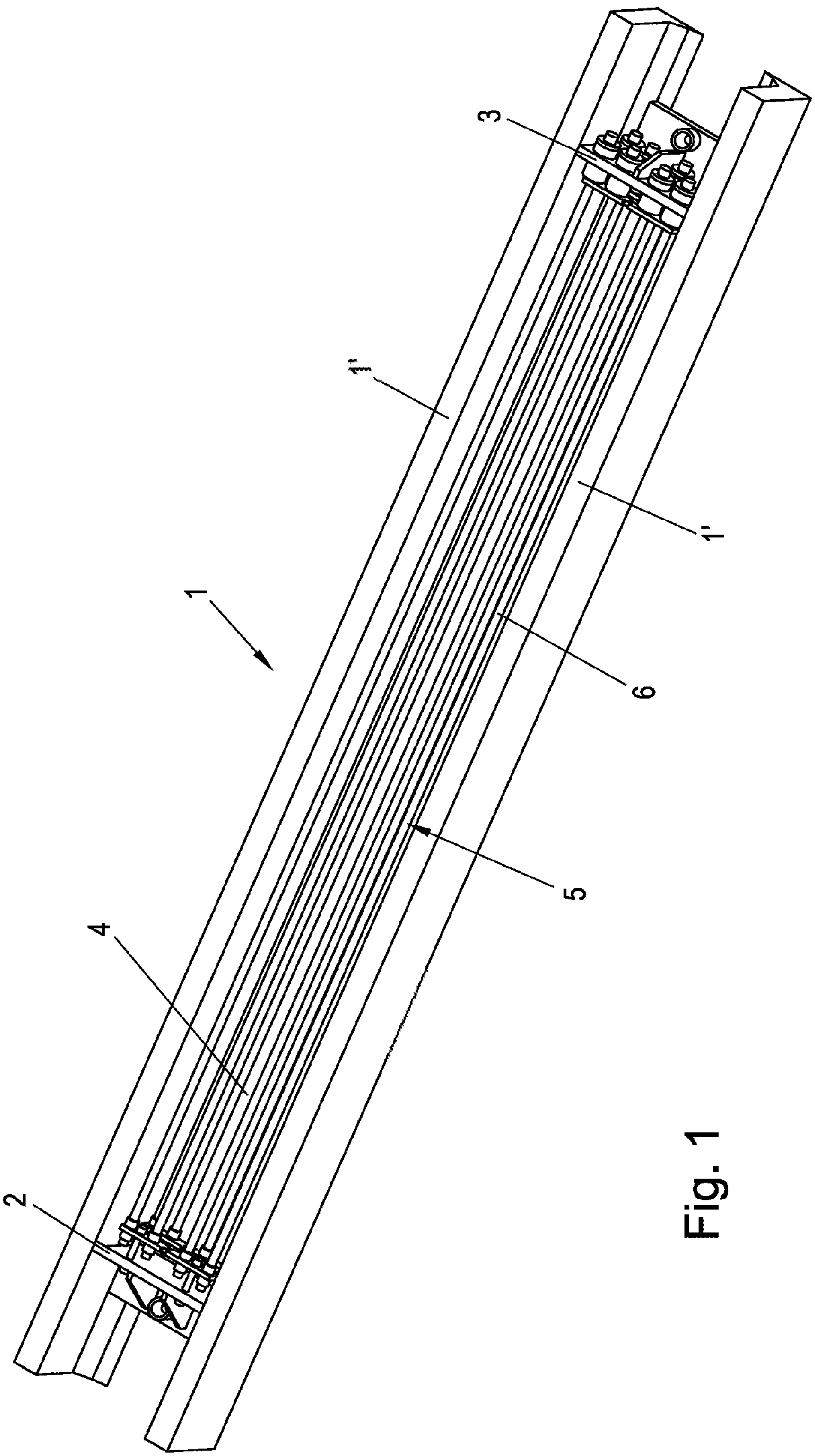

long bed, whereupon the concrete cast element is cast between the two separating elements and is at least partially hardened in the long bed.

24 Claims, 6 Drawing Sheets

(56) References Cited

OTHER PUBLICATIONS

Search Report dated Jul. 13, 2020, issued in corresponding International Patent Application No. PCT/IB2020/053793 with English translation (4 pgs.).
Written Opinion of the International Searching Authority dated Jul. 13, 2020, issued in corresponding International Patent Application No. PCT/IB2020/053793 (6 pgs.).

* cited by examiner

METHOD OF PRODUCING A PLURALITY OF CONCRETE CAST ELEMENTS

CROSS-REFERENCE TO RELATED APPLICATIONS

This application is a national stage entry of PCT/IB2020/053793, filed Apr. 22, 2020, which claims priority to European Patent Application No. 19450007.0 filed Apr. 23, 2019, the contents of each of which are herein incorporated by reference in their entireties.

The present invention relates to a method of producing a plurality of concrete cast elements of prestressed concrete, in particular for the production of railway sleepers, in a long bed which is a multiple of the length of a concrete cast element, in which separating elements are used in the long bed to define the length of each of the concrete cast elements to be cast, as well as a device for carrying out the method according to the invention.

In the field of prestressed concrete railway sleepers, a distinction is made between two methods of transferring a tension force to the concrete cast element.

On the one hand, there is the possibility of creating a direct bond between the tensioning elements or tensioning wires and the concrete, with a prestress being applied to a plurality of tensioning elements, usually in the form of tensioning wires, before the concrete is poured into a correspondingly shaped mold bed or tensioning bed. In order to improve the adhesion of the concrete, the tensioning elements or the tensioning wires have suitable surface structures or a significant roughness in order to achieve sufficient adhesion of the concrete element so that the desired pre-tensioning can be applied. After the concrete has hardened, the pre-tensioning is released and the tensioning elements or tensioning wires transmit a corresponding tension to the concrete body, for example to the railroad tie, via the direct bond with the concrete. In a railroad tie that is pre-tensioned in this manner, a transmission of the full pre-tensioning force is dependent on the quality of the concrete and the profile of the tensioning wire, but is in any case only in one way effective at a clear distance from the front sides of the concrete sleeper.

This results in the disadvantage that the end areas of railway sleepers produced in this way have a reduced strength and, as a result, tend to develop more cracks. The permissible operating time of such railway sleepers is therefore relatively limited.

Another concept is known as post-tensioning, the tension force being applied to the concrete cast element or the railway sleeper by tensioning the tension wire only after the concrete has hardened. For this purpose, in contrast to the concept of pre-tensioning, the tensioning element or tensioning wire must not have any appreciable adhesion to the concrete of the cast part, since the tensioning force should only act on suitable anchors.

A major advantage of the end anchoring is that the pre-tensioning is constant over the entire sleeper body and thus the susceptibility to cracking in the event of stress can also be significantly reduced in the end area of the concrete sleeper.

As a manufacturing process, on the one hand, the long-bed process for pre-tensioned railway sleepers and, on the other hand, the carousel process, especially for the production of post-tensioned concrete sleepers, are known.

In the long bed method, support plates or separating elements are placed in long beds according to the desired concrete sleeper length, the length of the long bed being a multiple of the length of a concrete cast element (approx. 100 m). The tensioning wires are pulled through the separating elements over the entire length of the long bed and tensioned by means of a separate tensioning frame or by means of foundations with appropriate abutments. Then the concrete is poured.

In the carousel process, a single sleeper body is each produced in its own molding box, which, in the case of the production of post-tensioned railway sleepers, contains a tensioning device that allows the tensioning wires to be tensioned after the concrete has hardened and is supported against the molding box before the concrete is poured. Then the concrete is poured in. Alternatively, a concrete sleeper with pre-tensioning can be produced using the carousel method.

While the long-bed process has only been able to produce pre-tensioned concrete parts with the mentioned disadvantages, pre-tensioned and post-tensioned railway sleepers can be produced in molding boxes. It would therefore be desirable to be able to manufacture pre-tensioned and post-tensioned railway sleepers in already existing long beds.

The present invention is therefore based on the object of producing stable, pre-tensioned and end-tensioned railway sleepers in the long bed.

To solve this problem, the method of the type mentioned at the outset is characterized according to the invention in that a first and a second separating element for defining the length of a concrete cast element together with a tensioning device with tensioning elements for tensioning the concrete cast element between the two separating elements are mounted in the long bed, whereupon the concrete cast element is cast between the two separating elements and is at least partially hardened in the long bed.

In the method according to the invention, two separate separating elements are assigned to each concrete casting to be cast or each railway sleeper to be cast in a long bed, i.e. a casting mold, whose length exceeds the length of a conventional railway sleeper many times and in particular has a length of 100 meters and more. Furthermore, in each of the areas delimited in this way by the two separating elements, a separate tensioning device is arranged with which the respective cast part can be tensioned, the tensioning elements being tensioned before the concrete is poured or only after the concrete has hardened. In this way, a large number of railway sleepers can be manufactured in a long bed in one casting process. In addition, compared to the carousel method with molding boxes, while the long bed in the method according to the invention is still occupied by the separating elements, the tensioning devices, possibly the concrete and also during the hardening of the concrete of a previous batch, one can already start to prepare the separating elements with the tensioning devices for a next batch outside of the long bed so that when the long bed becomes free, they only have to be inserted and fixed in order to continue pouring the concrete immediately. The preparation of the tensioning device usually includes attaching the tensioning elements to a first abutment to be cast in and, in the case of post-tensioning, sheathing the tensioning wires with a shuttering sleeve, which generally includes passing the wires through suitable hoses and threading a second abutment so that it becomes clear that it represents a considerable time saving if these steps can be carried out outside of the long bed, while the long bed is anyway occupied, for example, by hardening concrete masses. In contrast, in the case of the carousel process, it is necessary to wait until the molding boxes are free again after the concrete has hardened and the concrete castings have been removed in order to be able to start equipping the molding boxes with the tensioning devices.

With the method according to the invention, pre-tensioned or post-tensioned railway sleepers can thus be produced economically in already existing long-bed systems with a high throughput rate, the long bed being able to be filled with concrete almost continuously, since the preparation of the tensioning devices and the separating elements can already take place outside the long bed during the hardening process of the concrete.

When carrying out the method according to the invention, it is preferred to proceed in such a way that, after the concrete has partially hardened, the concrete cast element is tensioned while the tensioning elements are tensioned. In this way, post-tensioned concrete castings or railway sleepers can also be produced in the long bed, so that the advantages associated with post-tensioned railway sleepers can also be achieved in existing long-bed systems.

When carrying out the method according to the invention, according to a preferred embodiment of the present invention, the procedure is such that the separating elements are fixed by means of a screw connection on a transverse metal sheet supported on side elements of the long bed. For this purpose, the separating elements have an L-shaped cross section, optionally with reinforcing ribs, in order to screw the separating elements into corresponding threads of the transverse metal sheets. The transverse metal sheets are held on the two side elements below the long bed and screwed to the separating elements. This creates a firm connection between the separating elements and the long bed without the long bed itself having to be structurally redesigned.

The tensioning elements can be designed in various ways. In the context of the present invention, however, it is preferred for the production of post-tensioned concrete cast elements that the tensioning elements are designed as tensioning wires, the tensioning elements being guided in formwork sleeves in the area between the abutments. The tensioning wires are cut to the appropriate length and inserted into the formwork sleeves, usually simple plastic hoses. The formwork sleeves prevent direct contact and bonding with the later poured concrete, so that the tensioning elements can be brought to the required tension over the entire length of the concrete casting after the concrete has hardened and the concrete casting is consequently tensioned together from the ends.

The tensioning elements or tensioning wires can be suitably held in various ways between the separating elements in the long bed. According to a preferred embodiment of the present invention, however, it is provided that the tensioning elements are supported at their first end on an abutment designed as a fixed anchor element, which is preferably connected, in particular releasably connected, to the first separating element by means of at least one tensioning screw. Because the tensioning wires are fixed to a fixed anchor element, the tensioning wires are firmly anchored in the concrete after the concrete has been poured and hardened and can apply great tension forces to the concrete casting in order to brace it. Within the scope of the present invention, one tensioning element or one tensioning wire can be attached to each fixed anchor element, but it can also be provided that several tensioning elements, for example two tensioning elements, are attached to a common fixed anchor element. In the context of the present invention, the fixed anchor element is preferably designed as an anchor plate having a corresponding number of holes for receiving the tensioning elements, the tensioning elements being fixed to the fixed anchor element by suitable means. For this purpose, screw nuts, clamps or the like are particularly suitable, but the tensioning elements can also be caulked on the back of the fixed anchor elements. The fixed anchor elements are in turn fixed to the first separating element with appropriate spacers, for example by means of tensioning screws.

The final tensioning of the tensioning elements after the concrete has hardened is preferably carried out with the aid of tensioning nuts, which each interact with a corresponding thread at the second end of the tensioning elements. The tensioning nuts are supported on a tensioning anchor element in the cast concrete part, so that when the tensioning nuts are tightened, a tensile force is exerted on the tensioning elements or tensioning wires and the concrete is braced together.

In order to keep the tensioning nuts freely accessible for final tensioning, the method according to the invention is preferably further developed in that the tensioning elements are each connected, in particular screwed, to a tensioning sleeve at their second end, which is supported on the second separating element. The tensioning sleeves are removed after the concrete cast element has been poured and after the concrete has hardened, so that the recesses result in the concrete casting that are open towards the end face and which subsequently enable access to the second ends of the tensioning elements in order to be able to attach and tighten the tensioning nuts.

As already explained in connection with the first ends of the tensioning elements, the method according to the invention can preferably be developed in such a way that at least one abutment designed as a tensioning anchor element is cast into the concrete cast element to support tensioning nuts in the concrete cast element. In the context of the present invention, the at least one tensioning anchor element is preferably designed as an anchor plate with a plurality of holes for the tensioning elements to pass through.

In order to prevent the tensioning elements sagging before the concrete is poured, a preferred procedure provides that the tensioning elements are partially tensioned before the concrete cast element is poured, the tensioning force preferably being less than 10 kN per tensioning element. A low tensioning force is thus applied, which is just sufficient to bring the tensioning elements into a straight position, the tensioning preferably being carried out by pulling at least one end of the tensioning elements towards the respective separating element after the separating elements have been fixed in the long bed. It is preferably provided here that the first ends of the tensioning elements are held on the first separating element via the at least one fixed anchor element and the at least one tensioning screw, while the second ends of the tensioning elements are pulled to the second separating element by means of the tensioning sleeves. As already mentioned, the tensioning sleeves are preferably screwed to the second ends of the tensioning elements so that the required tensioning force can be applied by rotating the tensioning sleeves.

For the production of pre-tensioned concrete cast elements, the method according to the invention can be developed according to a preferred alternative in such a way that the tensioning elements are tensioned before the concrete cast elements are casted. In this case, the tensioning elements are designed without formwork sleeves and, if necessary, with a corresponding surface structure, in order to establish the tightest and most direct connection possible between the tensioning elements or the tensioning wires and the concrete. This procedure for the production of pre-tensioned concrete cast elements in the long bed has the advantage over the already known method for the production of pre-tensioned concrete cast elements in the long bed that the separating elements can be prepared with the tensioning devices for a subsequent batch outside the long bed, so that they only have to be inserted and fixed when the long bed is free, in order to proceed with pouring the concrete immediately.

In order to further increase the throughput rate, a preferred embodiment provides that the separating elements are removed after initial hardening, but before the final strength of the concrete has been reached, the tensioning elements are partially tensioned, the concrete cast element is removed from the long bed and the tensioning elements are then tensioned to final tension. Because the tensioning elements are partially tensioned after initial hardening, the concrete cast element can be given the stability required for removal from the long bed after a short hardening time, so that removal can take place after an extremely short time. In particular, the concrete cast element can be removed from the long bed as early as 16-48 hours after casting. After removal, further hardening takes place outside the long bed, with the post-tensioning of the concrete cast element taking place after a specified target strength has been reached. The tensioning elements are preferably partially tensioned to a tensioning force of 20-50 kN per tensioning element.

The device according to the invention for producing a plurality of concrete cast elements of prestressed concrete, in particular for producing railway sleepers, in a long bed which is a multiple of the length of a concrete cast element, is characterized according to the invention in that the device comprises a first and a second separating element with means for mounting the separating elements in the long bed and a tensioning device with tensioning elements which is arranged between the two separating elements. The device according to the invention can thus be arranged and fixed in a long bed, i.e. in an elongated casting mold, the length of which exceeds the length of a conventional railway sleeper many times and in particular has a length of about 100 meters and more, for each concrete casting to be cast or each railroad tie to be cast to define the length of the concrete casting. With the tensioning device between the two separating elements, the casting can be placed under tension before or after the at least partial hardening of the concrete. With a large number of devices according to the invention in a long bed, a large number of railway sleepers can be produced in one casting process. The tensioning devices according to the invention can already be prepared outside of the long bed while the concrete in the long bed is still hardening from the previous casting process, so that when the long bed is free, they only have to be inserted and fixed in order to continue pouring the concrete immediately. The preparation or upgrading of the tensioning device usually includes attaching the tensioning elements to an abutment to be cast, if necessary encasing the tensioning elements with a shuttering sleeve, which generally includes passing the tensioning elements through suitable hoses, and applying a second abutment so that it becomes clear that it saves a considerable amount of time if these steps can be carried out when the long bed is occupied anyway, for example, by hardening concrete masses.

With the device according to the invention, post-tensioned railway sleepers can thus be produced economically in existing long-bed systems with a high throughput rate, with the long bed being able to be filled with concrete almost continuously, since the preparation of the separating elements and tensioning devices already takes place during the hardening of the concrete outside the long bed.

According to a preferred embodiment of the present invention, the means for fixing the separating elements each comprise at least one screw for screwing into a corresponding thread of a transverse metal sheet supported on side elements of the long bed. For this purpose, the separating elements have an L-shaped cross section, optionally with reinforcing ribs, in order to screw the separating elements to the transverse metal sheets.

The tensioning elements are preferably designed as tensioning wires. Furthermore, the tensioning elements are preferably guided in formwork sleeves in the area between the separating elements for the production of post-tensioned railway sleepers. The tensioning elements are cut to the appropriate length and inserted into the formwork sleeves, usually simple plastic hoses. The formwork sleeves prevent direct contact and bonding with the later poured concrete, so that the tensioning elements can be brought to the required tension over the entire length of the concrete casting after the concrete has hardened.

According to a preferred embodiment of the present invention, the device according to the invention is further developed in that the tensioning elements are supported at their first end on at least one abutment designed as a fixed anchor element, which is preferably connected, preferably releasably connected, to the first separating element by means of at least one tensioning screw. The fixed anchor element is preferably designed as an anchor plate which has a plurality of holes for the passage of tensioning elements. The at least one fixed anchor element can be fastened to the first separating element with the aid of at least one tensioning screw, the tensioning screw preferably being releasably connectable to the fixed anchor element so that the tensioning screw can be removed and reused after the concrete has hardened.

It is also preferably provided that a tensioning sleeve is connected, in particular screwed, to the second end of a tensioning element and is supported on the second separating element. The tensioning sleeve is used to fasten the second end of the respective tensioning element to the second separating element and, if desired, to exert a slight pretension on the tensioning elements in order to prevent the tensioning elements from sagging before casting.

In order to ensure free accessibility for attaching the tensioning nuts for final tensioning at the second end of the tensioning elements, the device according to the invention is preferably developed in such a way that the tensioning sleeves are designed to provide a recess for attaching tensioning nuts to the second end of the tensioning elements after removal from the mold.

As already explained in connection with the first ends of the tensioning elements, the device according to the invention can preferably be developed in such a way that at least one abutment designed as a tensioning anchor element is arranged in the area of the second separating element to support tensioning nuts in the cast concrete part. In the context of the present invention, a tensioning anchor element is preferably an anchor plate which is equipped with a corresponding number of holes for receiving the tensioning elements, the tensioning elements being provided with a thread at the second end, onto which tensioning nuts are screwed and screwed against the anchor plate.

The separating elements according to the invention can be removed from the long bed after the concrete has hardened by pulling the separating elements axially from the railway sleepers. From this point of view it is possible with the device according to the invention to provide separating elements with a profile which results in a desired shaping of the end regions of the railway sleepers when the concrete is poured and hardened. In this context, it is particularly preferred that at least one of the separating elements has a negative shape for an end structure, in particular an end bevel on the concrete casting. For various reasons, railway sleepers should not necessarily have a purely cuboid shape at the ends and, in particular, railway sleepers are usually produced with chamfers which, in the prior art, can only be produced after the concrete has hardened, for example by grinding or cutting the concrete casting. Because the invention provides two separating elements for each concrete cast element, i.e. that not two concrete casting parts are separated from one another by a single separating element, the separating elements can be axially removed or withdrawn from the concrete cast parts, so that more complex shapes can also be cast that would demoulding transversely to the longitudinal axis of the concrete casting impossible.

Figure 4:
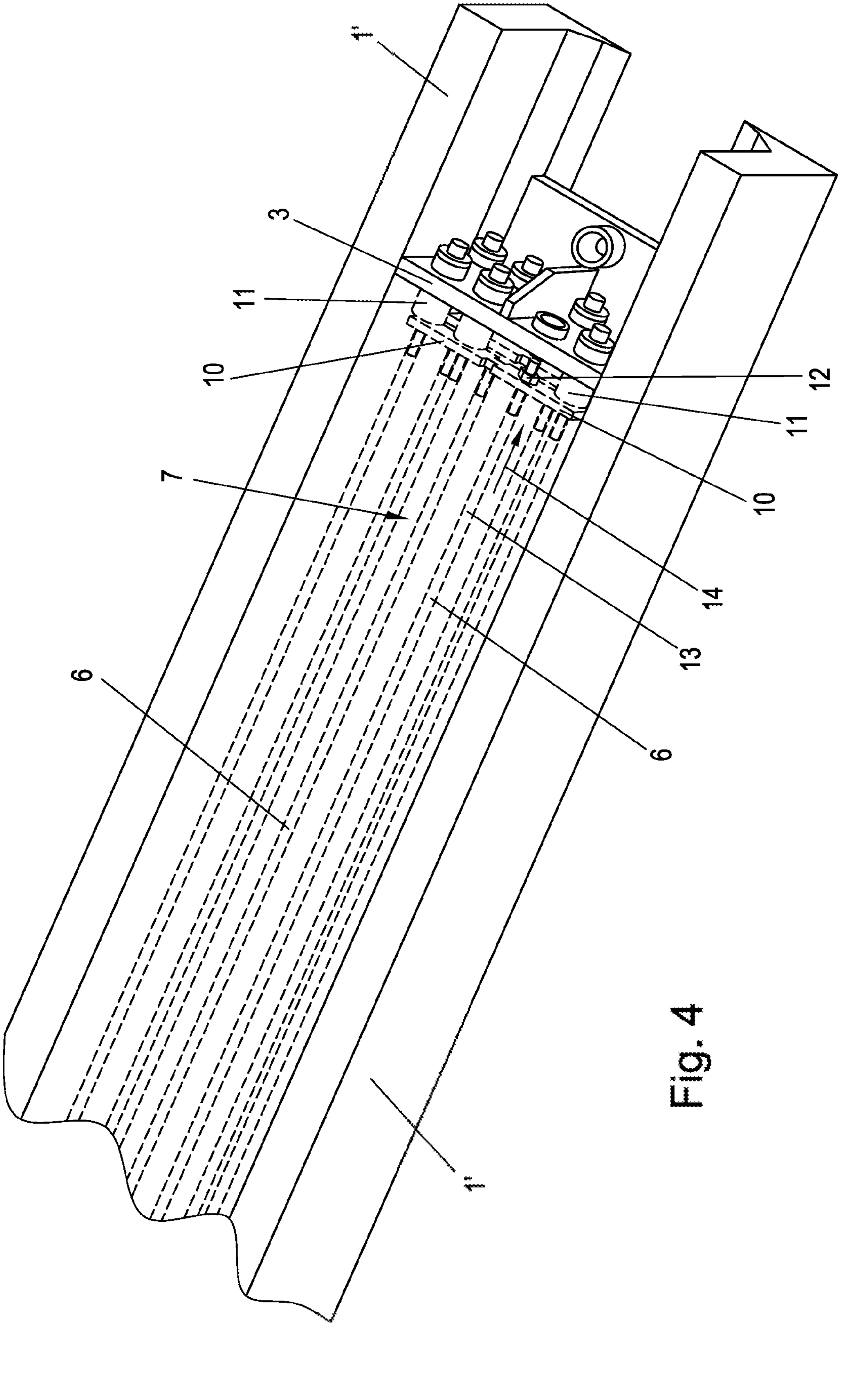
Figure 5:
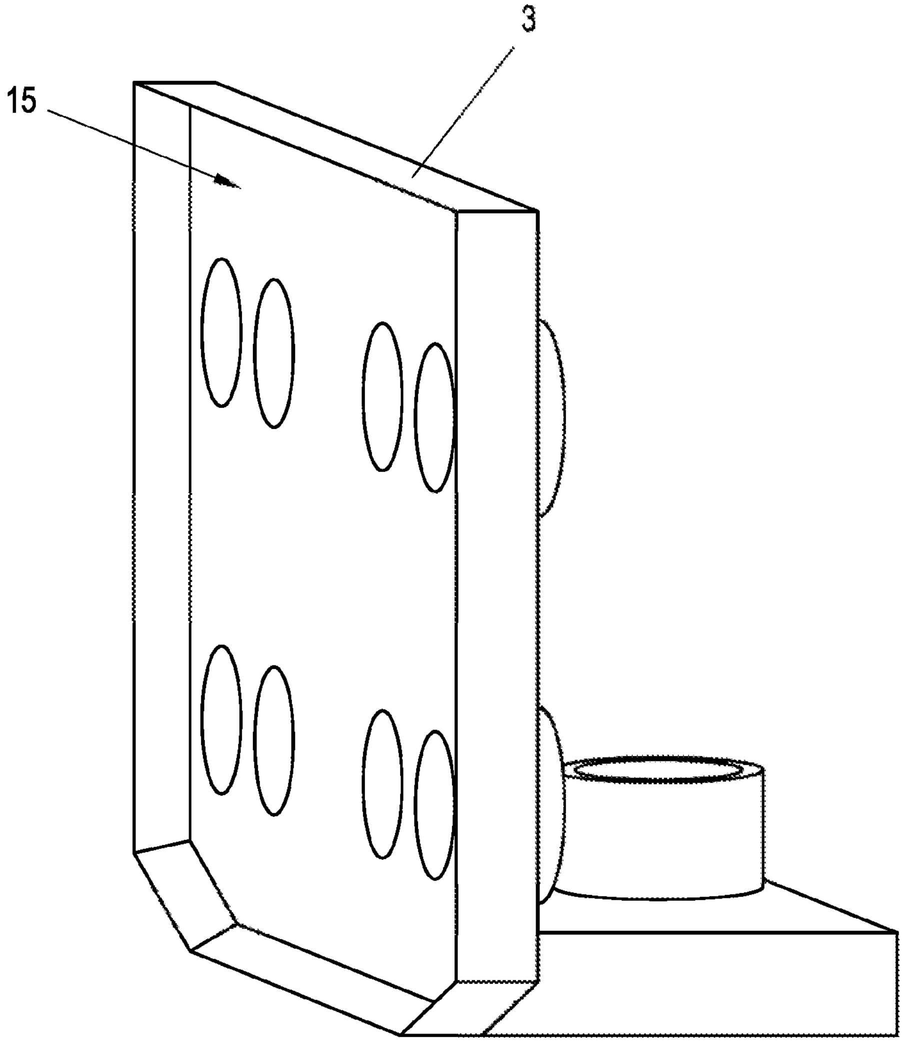
Figure 6:
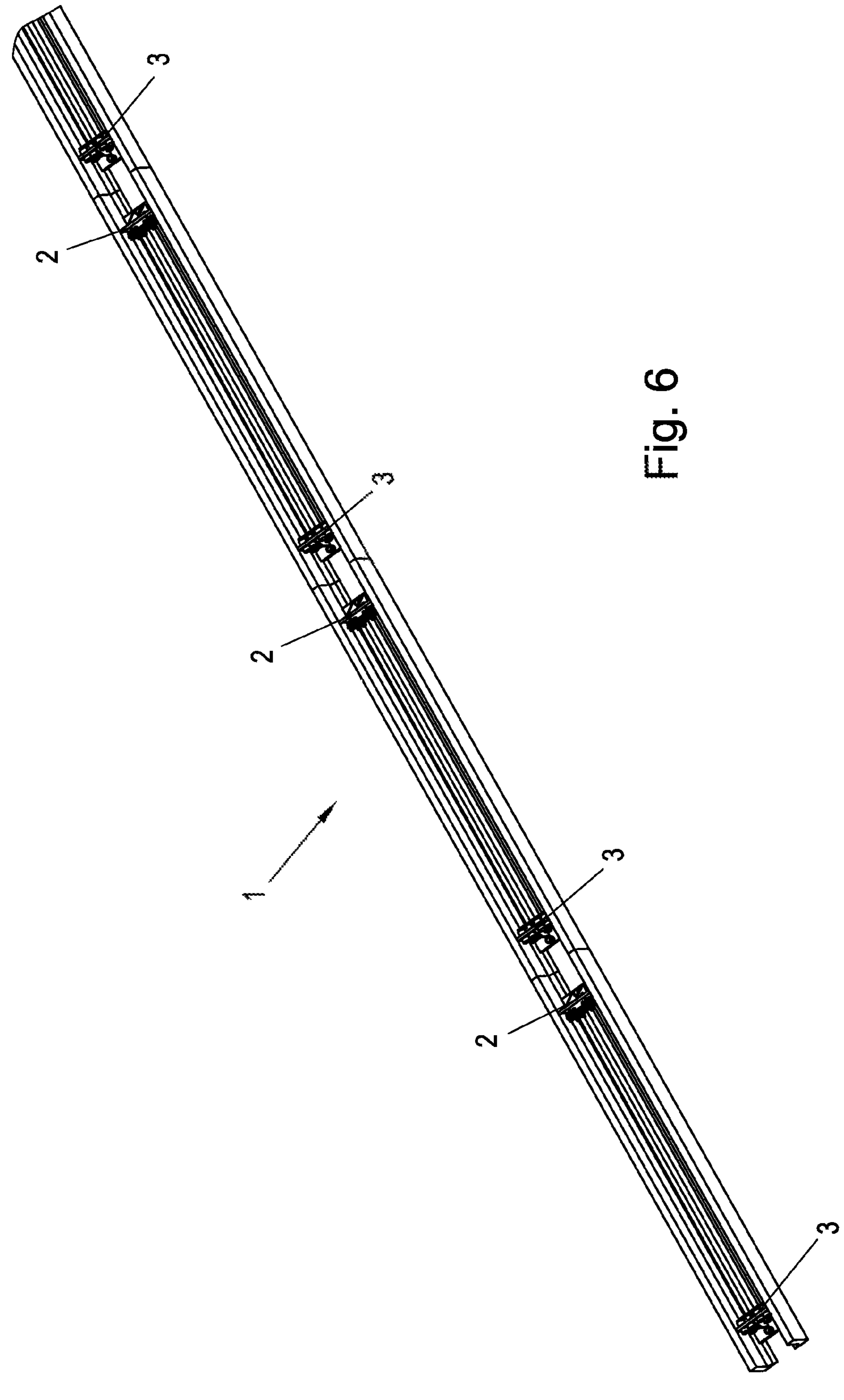

The invention is explained in more detail below with reference to an exemplary embodiment shown schematically in the drawing. Therein FIG. 1 shows a perspective overall representation of the device according to the invention, FIG. 2 shows a perspective detailed illustration of the first end region of the device according to the invention, FIG. 3 shows a perspective detailed illustration of the second end region of the device according to the invention, FIG. 4 shows a perspective detailed illustration of the second end region of the device according to the invention in an enlarged illustration, FIG. 5 shows a perspective illustration of a separating element of the device according to the invention and FIG. 6 shows a view with several devices according to the invention in a long bed.

In FIG. 1, a long bed is denoted by 1, wherein in FIG. 1 only a portion of such a long bed 1 is shown. In the long bed 1, a first separating element 2 and a second separating element 3 are fixed to side elements 1' of the long bed 1 by means of a screw connection. A tensioning device 5 with tensioning elements 6 is fixed between the two separating elements 2 and 3. A bottom plate 4 delimits the long bed 1 downwards. Concrete can be poured into the casting space 7 in order to form a railway sleeper between the separating elements 2 and 3, into which the tensioning device 6 is cast.

Figure 2:
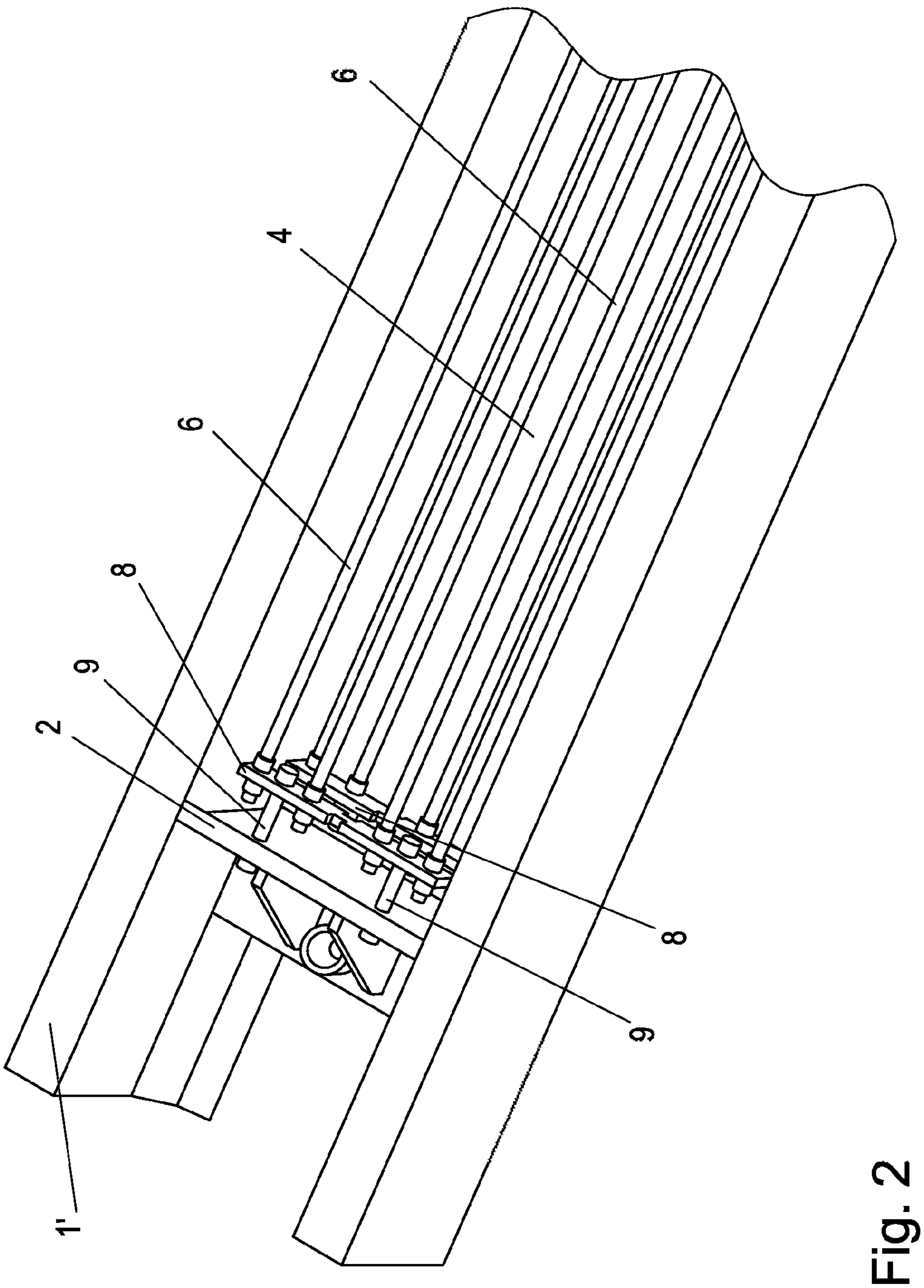

In FIG. 2 it can be seen that the tensioning elements 6 are fixed on the first separating element 2 with the interposition of first fixed anchor elements or anchor plates 8 and further with the interposition of tensioning screws 9. The anchor plates 8 form a strong abutment in the concrete in order to be able to exert tension forces on the concrete.

Figure 3:
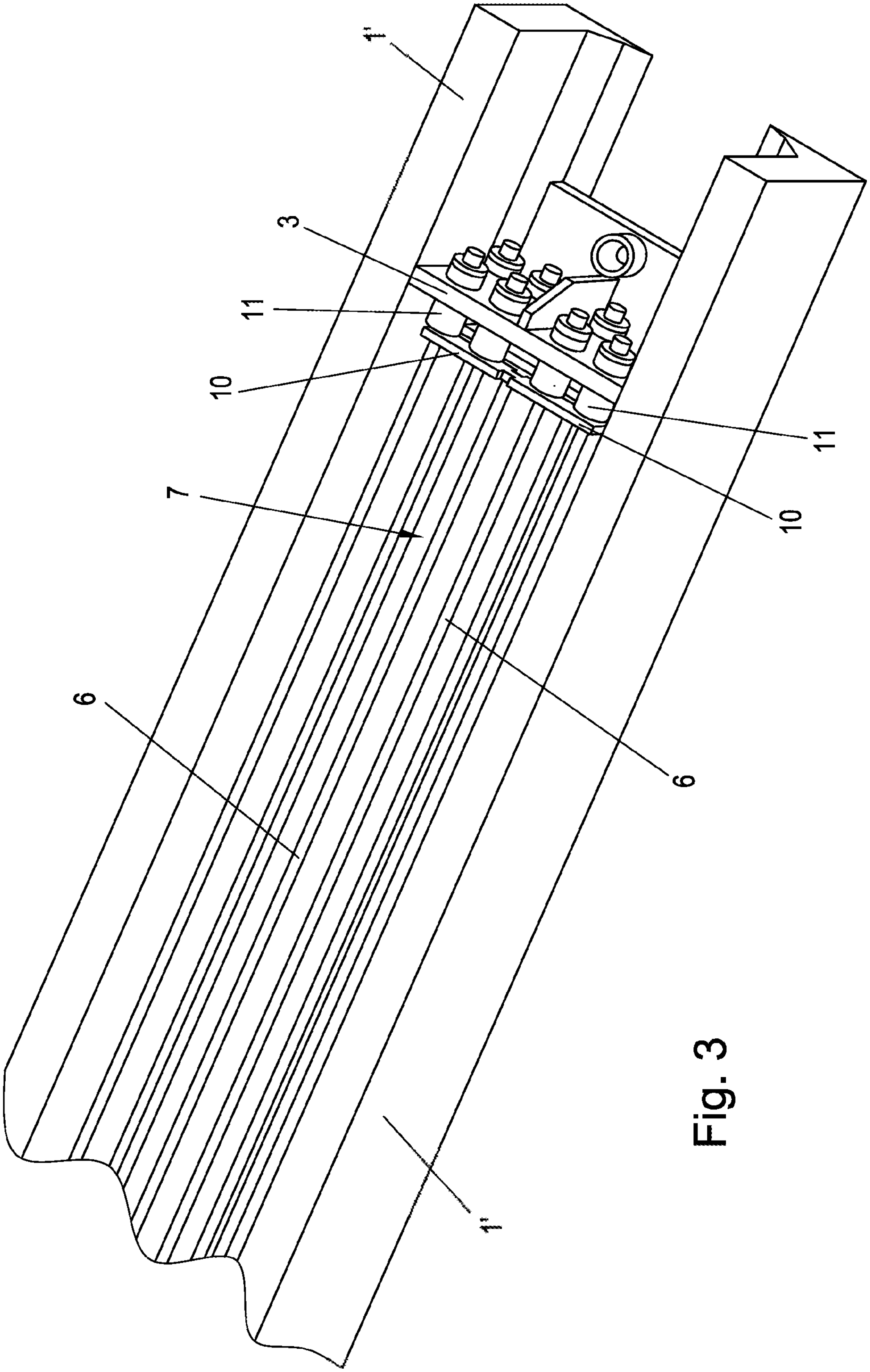

In FIG. 3 it is shown that the tensioning elements 6 pass through tensioning anchor elements or anchor plates 10 with their second end regions and are screwed to tensioning sleeves 11 which are connected to the second separating element 3. The tensioning sleeves 11 fix the second end of the tensioning elements 6 during casting and, after they have been removed from the hardened concrete, simultaneously create a recess which enables a tensioning nut 12 to be screwed onto the second ends of the tensioning elements 6.

In FIG. 4, one of the tensioning elements is taken as an example to show a recess which was created after a tensioning sleeve 11 was removed from the mold. Furthermore, a tensioning nut 12 can be seen which has been screwed onto the second end of the tensioning element 6. If the anchor plate 10 is now embedded in the concrete casting, tightening the tensioning nut 12 results in the tension wire 6, which is guided in a shuttering sleeve 13, being pulled in the direction of the arrow 14, thereby exerting a tension force on the concrete casting.

FIG. 5 illustrates that the separating elements 2 or 3 can have a negative shape for an end structure such as, for example, a chamfer. This would not be possible if the separating elements of the present invention were not accessible on both sides, since such a structure cannot be demolded transversely to the axial direction.

Finally, FIG. 6 shows that the long bed 1 has a length which exceeds the length of a concrete casting by a multiple and that therefore a plurality of devices according to the invention can be arranged in a long bed 1 and a large number of railway sleepers can be produced.

The invention claimed is:

1. A method for production of a plurality of concrete cast elements of prestressed concrete in a long bed which is a multiple of a length of a concrete cast element, comprising installing separating elements in the long bed to define the length of each of the concrete cast elements to be cast, characterized in that a first separating element and a second separating element for defining the length of each concrete cast element together with a tensioning device with tensioning elements for tensioning said concrete cast element between the first and second separating elements are mounted in the long bed, whereupon each concrete cast element is cast between the first and second separating elements and is at least partially hardened in the long bed.

2. The method according to claim 1, characterized in that each concrete cast element is tensioned after partial hardening of the concrete while tensioning the tensioning elements.

3. The method according to claim 1, characterized in that the first and second separating elements are mounted by means of a screw connection to transverse metal sheets supported on side elements of the long bed.

4. The method according to claim 1, characterized in that the tensioning elements are guided in formwork sleeves in an area between abutments.

5. The method according to claim 4, characterized in that the tensioning elements are supported at a first end thereof on at least one abutment designed as a fixed anchor element.

6. The method according to claim 5, characterized in that the tensioning elements are each connected at a second end thereof to a tensioning sleeve.

7. The method according to claim 6, characterized in that the tensioning elements are partially tensioned before each concrete cast element is casted.

8. The method according to claim 1, characterized in that at least one abutment designed as a tensioning anchor element is cast into each concrete cast element in order to support tensioning nuts in the cast concrete element.

9. The method according to claim 1, characterized in that the first and second separating elements are removed before the final strength of the concrete is reached, the tensioning elements are partially tensioned, the concrete cast element is removed from the long bed and the tensioning elements are then tensioned to final tension.

10. The method according to claim 1, characterized in that the tensioning elements are tensioned before the concrete cast elements are casted.

11. A device for producing a plurality of concrete cast elements of prestressed concrete in a long bed which is a multiple of the length of a concrete cast element, the device comprising a first separating element and a second separating element with means for mounting the first and second separating elements in the long bed and a tensioning device with tensioning elements which is arranged between the first and second separating elements.

12. The device according to claim 11, characterized in that the means for mounting the first and second separating elements each comprise at least one screw for screwing into a corresponding thread of a transverse metal sheet supported on side elements of the long bed.

13. The device according to claim 11, characterized in that the tensioning elements are guided in formwork sleeves in an area between abutments.

14. The device according to claim 11, characterized in that the tensioning elements are supported at a first end thereof on at least one abutment designed as a fixed anchor element.

15. The device according to claim 14, characterized in that a tensioning sleeve is connected to a second end of each tensioning element and is supported on the second separating element.

16. The device according to claim 15, characterized in that the tensioning sleeves are designed to form a recess for attaching tensioning nuts to the second end of the tensioning elements after removal from the first and second separating elements.

17. The device according to claim 11, characterized in that at least one abutment designed as a tensioning anchor element is arranged in an area of the second separating element to support tensioning nuts.

18. The device according to claim 11, characterized in that at least one of the first and second separating elements has a negative shape for an end structure of a face on each concrete cast element.

19. The method according to claim 4, wherein the tensioning elements are tensioning wires.

20. The method according to claim 5, wherein the fixed anchor element is releasably connected to the first separating element by means of at least one tensioning screw.

21. The method according to claim 6, where the tensioning elements are screwed to the tensioning sleeve and wherein the tensioning sleeve is supported on the second separating element.

22. The method according to claim 7, wherein the tensioning force is less than 10 kN per tensioning element, and the tensioning is carried out by means of the tensioning sleeves.

23. The device according to claim 13, wherein the tensioning elements are tensioning wires.

24. The device according to claim 14, wherein the fixed anchor element is releasably connected to the first separating element by means of at least one tensioning screw.

* * * * *